Jan. 12, 1971  D. W. BAKER ET AL  3,554,587
SEALING MEMBERS
Filed July 24, 1968  2 Sheets-Sheet 1
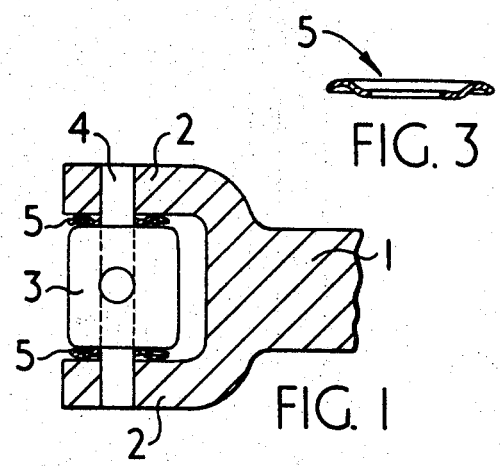
FIG. 3
FIG. 1
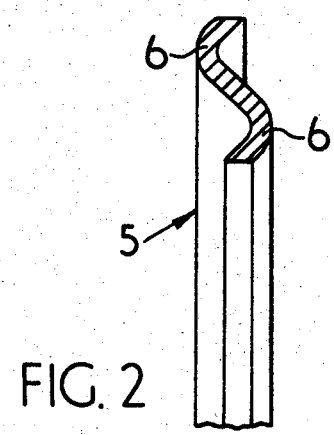
FIG. 2

United States Patent Office 3,554,587
Patented Jan. 12, 1971

3,554,587
SEALING MEMBERS
Denis W. Baker, Coalville, and Brian R. J. Haydon, Wigston Magna, England, assignors to The Dunlop Company Limited, London, England, a British company
Filed July 24, 1968, Ser. No. 747,382
Claims priority, application Great Britain, Aug. 2, 1967, 35,403/67
Int. Cl. F16j 15/38
U.S. Cl. 287—100                              5 Claims

ABSTRACT OF THE DISCLOSURE

An annular sealing washer having an axially projecting ridge on one side for interposition between two relatively rotatable joint members.

This invention relates to joints of the kind comprising two relatively rotatable joint members and to sealing members, particularly annular sealing washers, for interposition between the joint members of this kind of joint.

A joint between a pair of relatively angularly movable members, such as a pin joint between a pair of components in a motor car steering mechanism or other control linkage may need to be provided with a seal to prevent the ingress of dirt or moisture into the joint. Such a seal may take the form of an annular sealing member in the form of a metal, plastic or rubber washer mounted on and surrounding a coupling between the relatively movable members.

In the case of a forked or clevis-type joint a pair of washers may be provided, one at each end of the clevis pin. The washers may be located between the limbs of the forked member of the clevis joint, one on each side of a link member which is pivotally secured between the limbs of the forked member by the clevis pin.

One object of the invention is to provide a sealing member for a joint of the kind described which will provide effective sealing whilst accommodating axial displacement of one joint member relative to the other joint member.

According to one embodiment of the invention a joint comprises two joint members relatively rotatable about an axis and a resiliently deformable annular sealing member arranged around the axis between the joint members having its sides respectively in sealing engagement with the joint members, at least one of said sides having an annular, axially projecting ridge for sealing engagement with the associated joint member.

According to a further embodiment of the invention a joint comprises a first joint member having two limbs and a second joint member located between the two limbs and rotatable relative thereto about an axis passing through the two limbs and the second member, and two resiliently deformable annular sealing members arranged around the axis respectively between the two limbs and the second member, each of the sealing members having its sides respectively in sealing engagement with one of the limbs and the second member and at least one of said sides having an annular, axially projecting ridge for sealing engagement with the associated joint member.

The sealing member for a joint in accordance with the invention is preferably formed from a natural or synthetic rubber or plastics material, for example vulcanized natural or synthetic rubber, polyvinyl chloride, polyethylene, polyurethane, polyamides or other natural or synthetic polymers suitable for particular applications of the sealing member. The selection of a suitable material will depend, for example, on the type of lubricant to be employed in the joint and the physical conditions in which the joint will be required to operate.

Two embodiments of the invention will now be described by way of example, with reference to the accompanying drawings in which:

FIG. 1 is a diagrammatic cross-sectional view of a clevis joint according to the invention;

FIG. 2 is a diagrammatic view of part of one of the washers shown in FIG. 1;

FIG. 3 is a diagrammatic radial cross-sectional view of one of the washers shown in FIG. 1;

Figure 4:
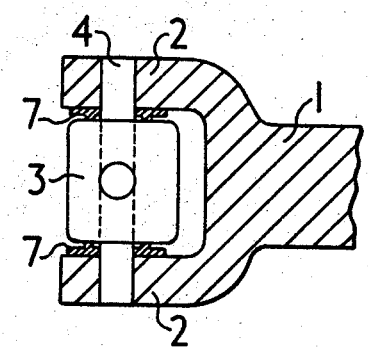
FIG. 4 is a diagrammatic cross-sectional view of a clevis joint, according to the invention, of an alternative design.

In one embodiment of the invention shown in FIG. 1 a clevis joint which may form part of a Hooke's type universal joint in a motor car steering linkage comprises a bifurcated joint member 1 having a pair of parallel limbs 2 between which a second joint member 3 is located. The joint members 1 and 3 are pivotally secured together by means of a shaft in the form of a clevis pin 4 which passes through aligned transverse bores in the limbs of the bifurcated joint member 1 and the second joint member 3.

The width of the second joint member 3 is less than that of the gap between the limbs 2 of the bifurcated joint member 1, to provide an adequate working tolerance. The resulting clearances between the sides of the second joint member 3 and the inner surfaces of the limbs of the bifurcated joint member are sealed by means of a pair of resiliently deformable sealing members in the form of washers 5, shown in FIGS. 2 and 3, fitted between the limbs and located around the clevis pin 4, one at each side of the second joint member.

Each resilient washer has an internal diameter of 0.578 of an inch and an external diameter of 0.845 of an inch and is formed by moulding from polyurethane so that in radial cross-section it has a smoothly curved S-shaped or corrugated profile. The wall thickness of the material of the washer is 0.03 of an inch, but the corrugated shape of the washer provides a pair of circumferentially extending ridges 6 which project axially in opposite axial directions from the central plane of the washer, and the overall thickness of the washer measured in the axial direction is 0.080 of an inch. The inner and outer peripheral edges of the washer are axially extending cylindrical surfaces.

The resilient washers described above have the advantage that their circumferentially extending ridges 6 provide sealing surfaces, for engagement with the corresponding joint members, which extend continuously around the axis of the joint and which are capable of resilient axial deformation without adverse effects on the sealing properties of the washers.

Figure 5:
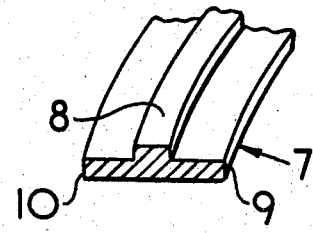
FIG. 5 is a diagrammatic view of part of one of the washers shown in FIG. 4.
Figure 6:
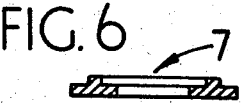
FIG. 6 is a diagrammatic radial cross-sectional view of one of the washers shown in FIG. 4.

In an alternative embodiment of the invention shown in FIG. 4, the resiliently deformable sealing members fitted between the limbs 2 of the bifurcated joint member 1 and the second joint member 3 of a clevis joint are each in the form of an annular disc-shaped washer 7, shown in FIGS. 5 and 6, having at least one circumferentially extending ridge 8 in the form of an annular coaxial lip projecting axially from one face of the washer and positioned at a radius mid-way between the inner and outer peripheries 9, 10 of the washer.

Having now described our invention, what we claim is:

1. A joint comprising a first joint member having two limbs and a second joint member located between the two limbs and angularly movable relative thereto about an axis passing through the two limbs and the second member, the opposed surfaces of the limbs and the second joint member extending substantially at right angles with respect to the axis of relative angular movement of the two members, and a resiliently deformable annular polymeric sealing member arranged around the axis between each limb and the respective opposed surface of the second member, each sealing member having a corrugated radial cross-sectional shape, the corrugations providing at least one axially projecting ridge on one side of the sealing member to make sealing engagement with the adjacent limb and at least one axially projecting ridge on the other side of the sealing member to make sealing engagement with the second member.

2. A joint according to claim 1 wherein the two joint members form a portion of a shaft, the axis of relative rotation of the members being the axis of the shaft.

3. A joint according to claim 1 wherein the corrugations of the sealing members are of a smoothly curved form.

4. A joint according to claim 1 wherein the sealing members each have a single corrugation providing an axially projecting ridge on each side.

5. A joint according to claim 1 wherein the radially inner and outer peripheral edges of each sealing member are in the form of cylindrical surfaces.

References Cited

UNITED STATES PATENTS

| | | | |
|---|---|---|---|
| 2,678,837 | 5/1954 | Griefen | 277—95 |
| 3,213,644 | 10/1965 | Murphy | 64—17 |
| 3,345,078 | 10/1967 | Bialkowski | 277—236X |

FOREIGN PATENTS

| | | | |
|---|---|---|---|
| 658,627 | 8/1936 | Germany | 277—95 |

WILLIAM F. O'DEA, Primary Examiner

R. I. SMITH, Assistant Examiner

U.S. Cl. X.R.

64—17; 277—65